8743½X
M. W. BALDWIN.
Car Wheel.
Patented Apr. 3, 1835.
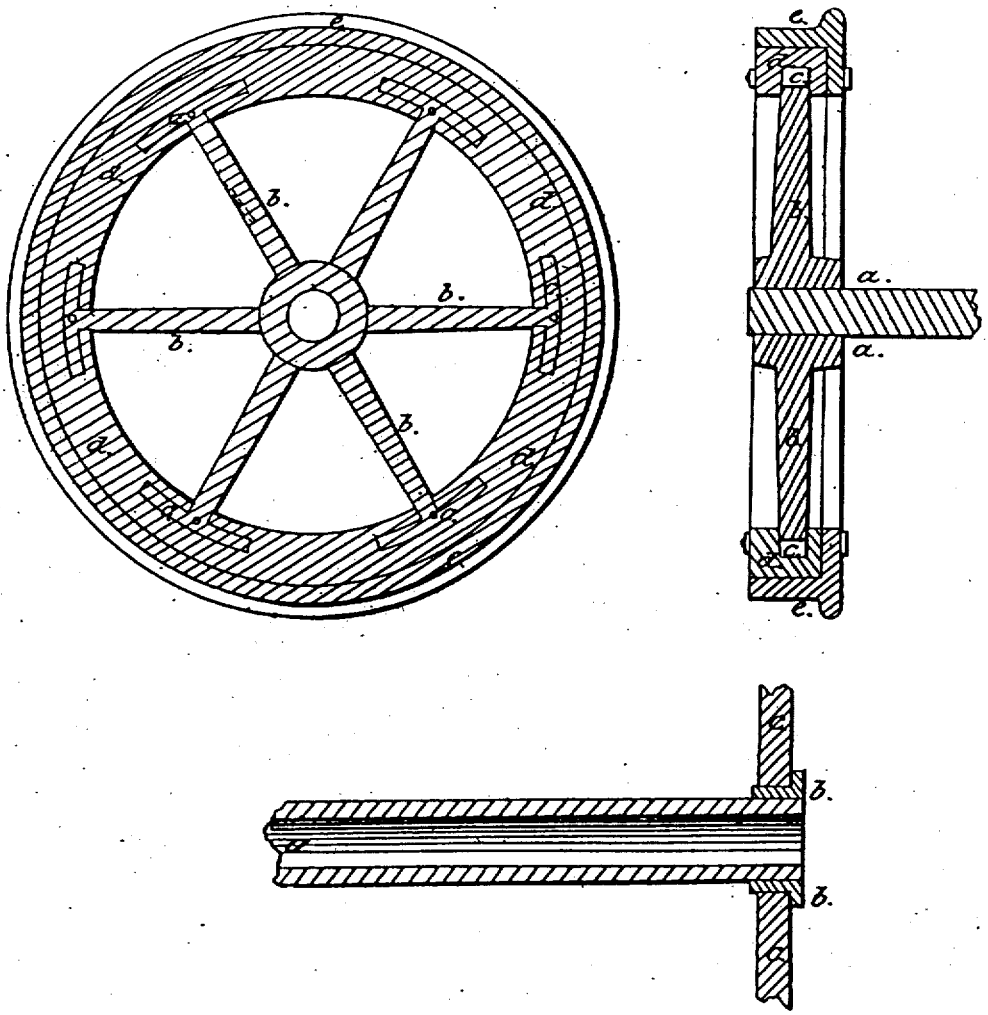
THE KOMPS PETTIS CO., PHOTO-LITHO., WASHINGTON, D. C.

UNITED STATES PATENT OFFICE.

8743½X

MATTHAIS W. BALDWIN, OF PHILADELPHIA, PENNSYLVANIA.

IMPROVEMENT IN WHEELS AND BOILER-TUBES OF LOCOMOTIVE-ENGINES.

Patented April 3, 1835.

*To all whom it may concern:*

Be it known that I, MATTHAIS W. BALDWIN, machinist, of the city of Philadelphia, and State of Pennsylvania, have made certain Improvements in the Wheels and in the Boiler-Tubes of Locomotive-Engines for Railroads, which improvements, so far as the wheels are concerned, are applicable to railroad-cars also, and that part which appertains to the tubes of boilers is applicable to all steam-engine boilers in which such tubes are employed; and I do hereby declare that the following is a true and exact description of my said improvement.

It is well known to engineers upon railroads that in running upon iron tracks the wrought tire forming the tread of the wheel, when the wheel is altogether of iron, is gradually stretched and becomes loose. To prevent this, rims of wood have been interposed between the tire and the rim of a cast-iron wheel; but I have invented an improved mode of interposing wood, which, while it is more simple than the plans heretofore adopted, is frequently efficacious, and secures certain other advantages not attained by the methods alluded to. I cast the hub and spokes of the wheel of common soft iron, without a rim; but the spokes have projections on their outer ends forming sections of a rim, such as would be produced by casting it with a flat rim and afterward dividing this by cutting out a piece therefrom, two or three inches wide, midway between each spoke. These projections form suitable bearing within the rim by which the spokes are to be surrounded. It will be perceived that in making such a casting the hub may be made solid and without bands.

The rim may be made in various ways—that is, it may be entirely of cast or entirely of wrought iron; or it may be in part of cast-iron with a wrought-iron tire. I intend in general, however, to make the rim of cast-iron, chilled in the usual manner, by which means the strain, which always exists when the spokes and rim are cast together, will be prevented; but the main object in view is the interposing between the spokes and the rim a layer of wood or other substances possessing a similar degree of elasticity. For this purpose the spokes are cast of such length as will admit of its introduction, leaving a space between their ends and the interior of the rim, say of one inch, (more or less.)

To attach the spokes and the rim to each other I cast the rim with a flange, one side projecting inward, so as to form a bearing for the projecting ends of the spokes when the two parts are put together. Screw-bolts are then passed through the ends of each spoke and through the flange, by which means they are firmly united to each other.

The pieces of wood between the spokes and the rim may be secured in their places in various ways—as, for example, the projecting ends of the spokes may be made flat, so that the pieces of wood will also be flat on the side which bears upon them and curved where they bear upon the interior of the rim. This will prevent all tendency to motion endwise, while there may be a projecting fillet upon the end of the spokes to check them sidewise. There may also be a plate cast separately from the spokes through which the screw-bolts may pass, so as to draw them down firmly upon the wood to confine it in its place. The drawing deposited in the Patent Office will illustrate these methods; but without, a competent workman would find no difficulty on this point. A hub and spoke cast in this way may serve for many rims, and these latter may be renewed without the necessity of taking the arms from the axles.

The plan now pursued of putting the tubes which serve as flues into the boilers of locomotive-engines is to pass through the heads of the boilers, and then to drive "ferrules" or "thimbles," as they are called, into each end of the tube. This of course diminishes the size of the tubes at each end, causing them to become obstructed more readily by coals, soot, and dust, and rendering it more difficult to clean them out than would be the case were they of equal size throughout. To obviate this difficulty I drive the ferrules or thimbles onto the outside of the projecting ends of the tube and solder them in their places, by this means rendering the tubes much stronger than they are in the former way, and having them of the same diameter throughout.

What I claim as my invention in the apparatus herein described is—

1. The introduction of wood or other substance similar in elasticity between the ends of spokes separated from each other and the interior of the rim of a wheel, in the manner and for the herein purpose set forth.

2. The securing the ferrules or thimbles upon the outside of the ends of tubes passing through boilers, as above specified and described.

M. W. BALDWIN.

Witnesses:
A. PETTITS,
GEO. W. HUFTY.